(12) United States Patent
Stover et al.

(10) Patent No.: US 8,573,368 B2
(45) Date of Patent: Nov. 5, 2013

(54) MOTOR DRIVEN PARKING BRAKE ACTUATOR SYSTEM FOR MOWER

(75) Inventors: Dale A. Stover, Plymouth, MN (US); Karl D. Heal, St. Paul, MN (US); Steven R. Porter, Burnsville, MN (US)

(73) Assignee: The Toro Company, Bloomington, MN (US)

( * ) Notice: Subject to any disclaimer, the term of this patent is extended or adjusted under 35 U.S.C. 154(b) by 197 days.

(21) Appl. No.: 13/069,088

(22) Filed: Mar. 22, 2011

(65) Prior Publication Data

US 2012/0241263 A1    Sep. 27, 2012

(51) Int. Cl.
*B60T 1/00* (2006.01)
(52) U.S. Cl.
USPC .......................... 188/31; 188/265; 192/219.5
(58) Field of Classification Search
USPC ................... 188/31, 265, 113, 156, 162, 161; 192/219.4, 219.5; 180/275; 56/11.3; 74/577 R, 577 M
See application file for complete search history.

(56) References Cited

U.S. PATENT DOCUMENTS

| | | | | |
|---|---|---|---|---|
| 1,673,210 A | * | 6/1928 | Smith | 188/204 R |
| 3,400,767 A | * | 9/1968 | Hermiz | 172/820 |
| 4,466,232 A | * | 8/1984 | Beugelsdyk et al. | 56/10.8 |
| 5,113,977 A | * | 5/1992 | Ridings et al. | 188/69 |
| 5,634,534 A | * | 6/1997 | Kanai et al. | 188/67 |
| 6,125,983 A | * | 10/2000 | Reed et al. | 192/219.5 |
| 6,739,116 B2 | | 5/2004 | Stover | |
| 2004/0050026 A1 | * | 3/2004 | Stover et al. | 56/11.3 |
| 2004/0074692 A1 | * | 4/2004 | Rupiper et al. | 180/336 |
| 2004/0094373 A1 | * | 5/2004 | Klammer | 188/162 |
| 2005/0225166 A1 | * | 10/2005 | Greenberg et al. | 303/89 |
| 2008/0156568 A1 | * | 7/2008 | Raz | 180/275 |
| 2008/0217123 A1 | * | 9/2008 | Fujita | 188/161 |

* cited by examiner

*Primary Examiner* — Robert A Siconolfi
*Assistant Examiner* — Charles Poon
(74) *Attorney, Agent, or Firm* — James W. Miller

(57) ABSTRACT

A parking brake actuator system for an outdoor power equipment unit, such as a riding lawn mower, comprises a reversible electric motor that drives a gear reduction assembly. The gear reduction assembly rotates an output shaft at a speed slower than the speed of rotation of the motor. The output shaft has opposite ends that are linked by a pair of actuating rods to a pair of parking brakes. As the motor is rotated in reverse rotary directions, the connecting portions of the rods that are coupled to the parking brakes are moved in opposite, straight line directions to move the parking brakes between brake disengaged and brake engaged positions.

4 Claims, 5 Drawing Sheets

MOTOR DRIVEN PARKING BRAKE ACTUATOR SYSTEM FOR MOWER

TECHNICAL FIELD

This invention relates to an outdoor power equipment unit, such as a riding lawn mower, having a parking brake system.

BACKGROUND OF THE INVENTION

When operating an outdoor power equipment unit such as a riding lawn mower, the operator frequently needs to dismount the unit. Most units of this type have parking brake systems to prevent the unit from rolling away when the operator dismounts. A manually operated brake lever is usually provided to engage and disengage the parking brake system. If the operator forgets to set or engage the parking brake system as the operator dismounts, the unit can roll away if the unit is located on an incline when the operator dismounts. This is obviously undesirable.

Various riding lawn mowers are controlled by twin control sticks or handles that are selectively manipulated by the operator to propel and steer the unit. The control sticks have a neutral position in which the unit is at rest. To propel the unit forwardly, the sticks are pushed forwardly by the operator from the neutral position. To propel the unit rearwardly, the sticks are pulled rearwardly by the operator from the neutral position. Steering is accomplished by pushing or pulling on one stick more than the other or even by pushing one stick forwardly while pulling the other stick rearwardly. U.S. Pat. No. 3,702,051 to Deines shows a mower of this type.

The twin control sticks of units of this type have an inboard position in front of the operator's seat where they are conveniently located in front of the operator's hands. Such control sticks are also pivotal about longitudinal, fore-and-aft axes to allow the sticks to be pivoted laterally into outboard positions. In their outboard positions, the control sticks have been laterally moved to positions that are further to the sides of the operator's seat.

U.S. Pat. No. 6,434,917 to Bartel shows a twin stick mower in which the control sticks are linked by mechanical linkages to a parking brake system comprising a pair of parking brakes, one for each drive train controlled by each control stick. When the operator pivots the control sticks into their outboard positions, the mechanical linkages automatically engage the parking brakes. However, in Bartel, the mechanical linkages are elongated and extend vertically to connect between the parking brakes and the control sticks. Moreover, the linkages include ball joints to accommodate the lateral pivoting of the control sticks when the control sticks are placed in their outboard positions. Thus, the mechanical linkages are relatively cumbersome and are located in an area of the mower where space is tight.

U.S. Pat. No. 6,739,116 to Stover discloses an alternative to Bartel in which an electrical solenoid is used as an actuator for the parking brakes. When the control sticks are in their inboard positions, this is sensed by an electrical switch which acts to energize the solenoid to cause the parking brakes to be disengaged. When the control sticks are pivoted outwardly by the operator into their outboard positions, this is also sensed through the switch and the solenoid is deenergized, allowing a biasing spring to then move the parking brakes into an engaged position. However, while this system is effective, the use of an electrical solenoid is relatively costly and the force provided by a solenoid is not constant over its entire stroke.

SUMMARY OF THE INVENTION

One aspect of this invention relates to a parking brake actuator system for an outdoor power equipment unit. The outdoor power equipment unit has at least one parking brake which prevents motion of the outdoor power equipment unit when the parking brake is in a brake engaged position and which permits motion of the outdoor power equipment unit when the parking brake is in a brake disengaged position. The parking brake actuator system comprises a reversible electric motor having a rotatable output shaft. A second rotatable output shaft is provided that is separate from the motor output shaft. The second output shaft is driven from the motor output shaft through a speed reduction assembly such that the second output shaft rotates more slowly than the motor output shaft. A connecting link is operatively connected to the second output shaft for rotation therewith. A brake actuating rod has a pivot connection to the connecting link with the pivot connection being off-center relative to the rotational axis of the second output shaft. The brake actuating rod also has a connecting portion that is operatively coupled to the parking brake. The connecting portion of the brake actuating rod is elongated along an axis of elongation and moves in opposite substantially straight line directions along the axis of elongation when the second output shaft is rotated in opposite rotary directions to thereby allow the connecting portion of the brake actuating rod to place the parking brake in the brake engaged and disengaged positions.

Yet another aspect of this invention relates to a parking brake actuator system for an outdoor power equipment unit having an implement for performing a turf or ground grooming or working operation. The outdoor power equipment unit has at least one parking brake which prevents motion of the outdoor power equipment unit when the parking brake is in a brake engaged position and which permits motion of the outdoor power equipment unit when the parking brake is in a brake disengaged position. The parking brake actuator system comprises a brake actuating rod having an elongated connecting portion that carries first and second abutments that are spaced apart from one another along the connecting portion. The parking brake has a portion that contains a bore which bore slidably receives the connecting portion of the brake actuating rod therein with the bore containing portion of the parking brake being located between the abutments. A first spring is located around the connecting portion and has one end bearing against the first abutment and another end bearing against one side of the bore containing portion of the parking brake. A second spring is located around the connecting portion and has one end bearing against the second abutment and another end bearing against the other side of the bore containing portion of the parking brake. A reversible electric motor has a rotatable motor output shaft that is operatively linked to the brake actuating rod to move the connecting portion in opposite first and second directions as the motor output shaft is rotated in opposite rotary directions. The connecting portion when moving in the first direction causes the first abutment to move towards the bore containing portion of the parking brake to compress the first spring to push on the one side of the bore containing portion of the parking brake to move the parking brake into the brake engaged position. The connecting portion when moving in the second direction causing the second abutment to move towards the bore containing portion of the parking brake to compress the second spring to push on the other side of the bore containing portion of the parking brake to move the parking brake into the brake disengaged position.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

U.S. Pat. No. 6,739,116, assigned to The Toro Company, the assignee of this invention, discloses a parking brake actuator system for engaging and disengaging the parking brakes of a self-propelled riding lawn mower. This invention relates to an improved parking brake actuator system for the type of mower shown in the 116 patent, namely to a mower having dual independent drive systems for propelling drive wheels on opposite sides of the frame of the mower. The drive systems are controlled by a pair of operator manipulated control sticks. U.S. Pat. No. 6,739,116 is hereby incorporated by reference for teaching the details of such a mower and the details of the prior parking brake actuator system disclosed therein.

Figure 5:
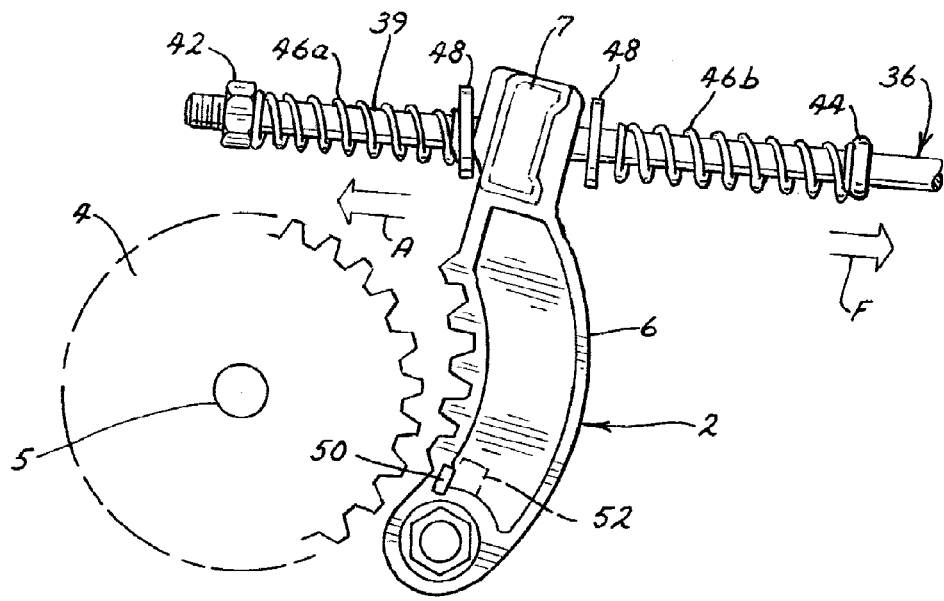
FIG. 5 is a side elevational view of one of the parking brakes of the system of FIG. 1, particularly illustrating the connection between the parking brake and its actuating rod with the parking brake being shown in the brake disengaged position.
Figure 6:
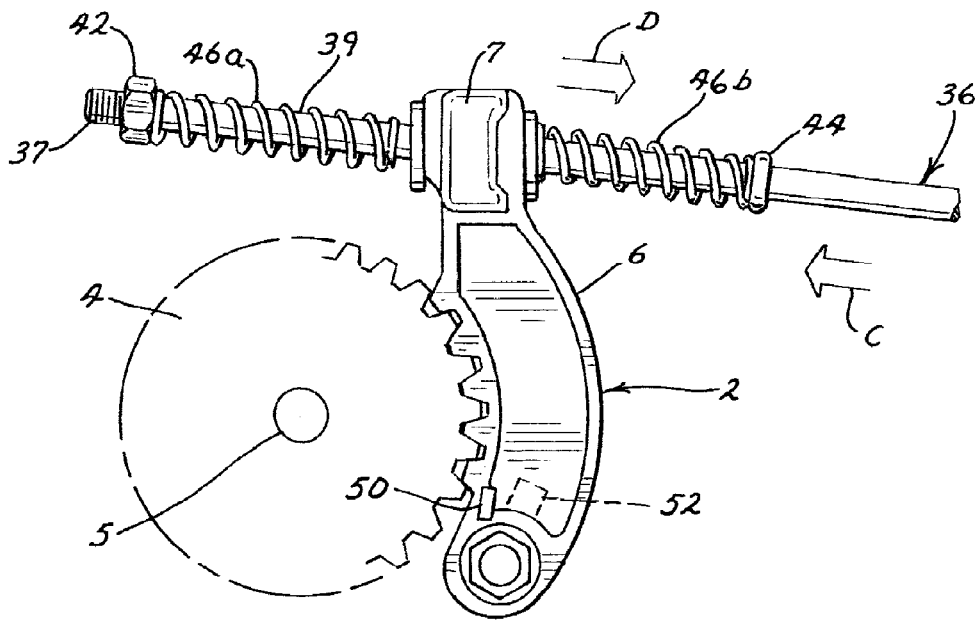
FIG. 6 is a side elevational view similar to FIG. 5, but showing the parking brake in the brake engaged position.

Referring first to FIGS. 5 and 6, one parking brake 2 for the drive wheel or wheels on one side of the mower is shown. There is an identical parking brake 2 on the other side of the mower. A gear 4 is located on the output shaft 5 of a hydrostatic transmission or transaxle that operatively powers the drive wheel or wheels on the corresponding side of the mower. Parking brake 2 comprises a pivotal, toothed brake lever 6 that can be selectively engaged with the teeth of gear 4 in the brake engaged position as shown in FIG. 6, or that can be selectively disengaged from the teeth of gear 4 in the brake disengaged position as shown in FIG. 5. This invention relates to a parking brake actuator system 8 whose purpose is to pivot levers 6 between the positions shown in FIGS. 5 and 6 and to hold or retain levers 6 in each of these positions.

Figure 1:
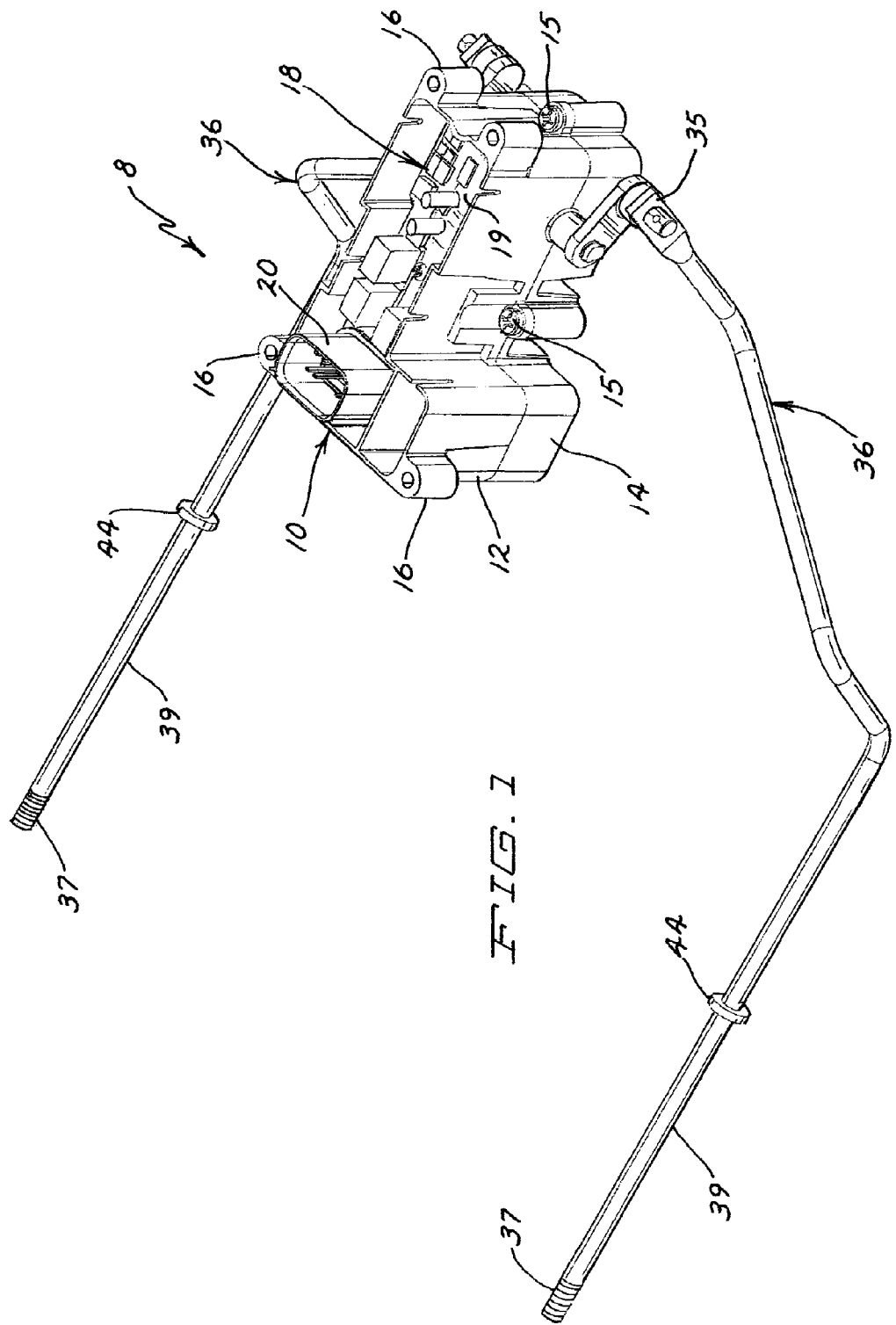
FIG. 1 is a perspective view of a parking brake actuator system for a mower according to one embodiment of this invention, particularly illustrating an exterior of a motor housing of the system and showing two brake actuating rods extending from the housing with the rods being disposed in their brake disengaged positions.
Figure 2:
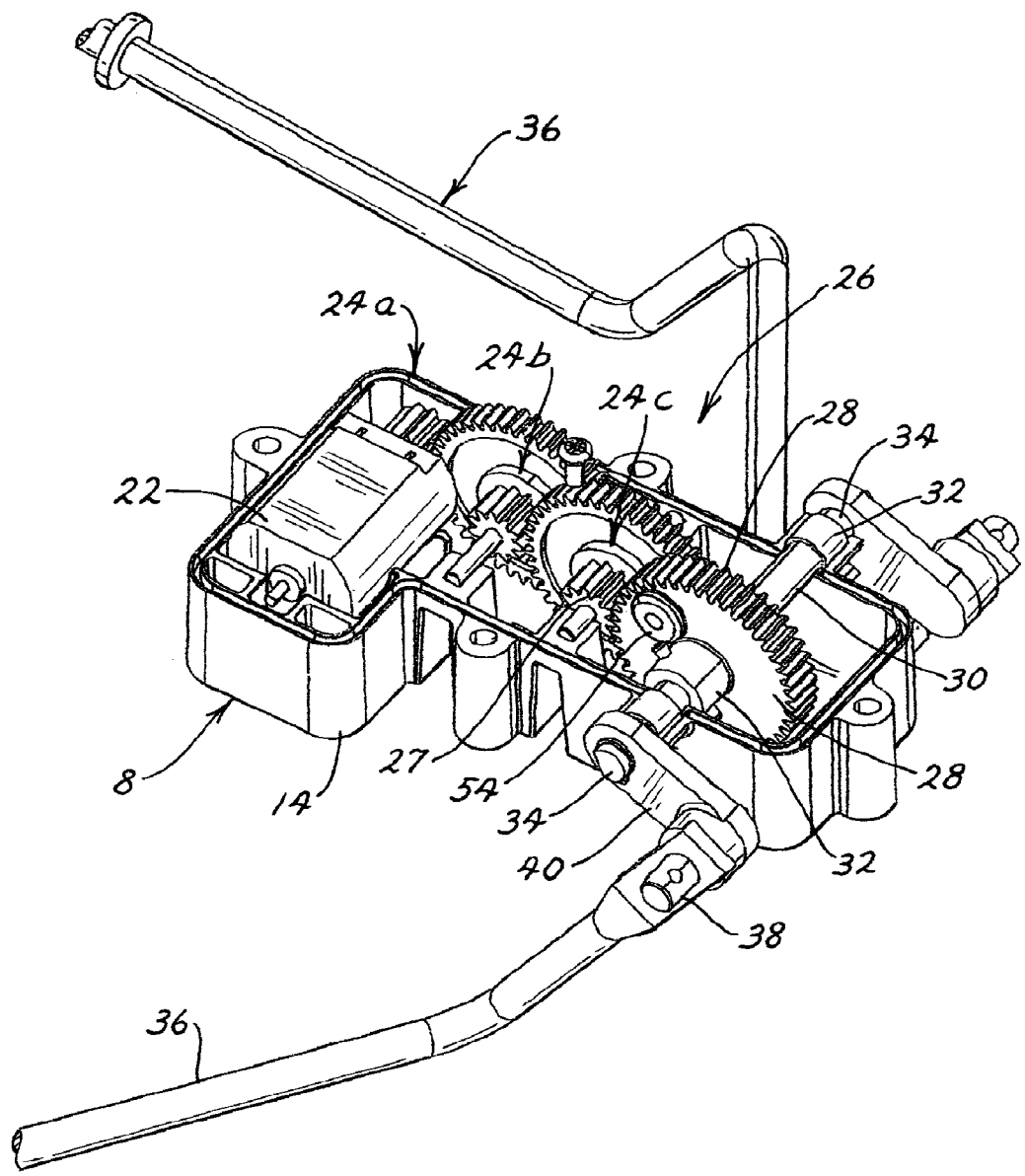
FIG. 2 is a perspective view similar to FIG. 1, but with a portion of the motor housing having been removed to particularly illustrate an electrical motor that is coupled by a speed reduction assembly to an output shaft connected to the brake actuating rods.

One embodiment of a parking brake actuator system 8 according to this invention is shown in FIGS. 1-6 hereof. Referring first to FIGS. 1 and 2, system 8 comprises a motor housing 10 having a top 12 and a bottom 14 that are secured to one another by a plurality of fasteners 15. Housing 10 includes a plurality of mounting bosses 16 to allow housing 10 be bolted to the frame of the mower on which system 8 is used. Top 12 of housing 10 carries a microprocessor based controller, indicated generally as 18, mounted on a printed circuit board 19. In addition, top 12 of housing 10 includes an electrical connector 20 that carries electrical power and mower operational data and control signals to and from housing 10.

Referring now to FIG. 2, in which top 12 of housing 10 has been removed for the sake of clarity, bottom 14 of housing 10 encloses and mounts a simple, inexpensive, reversible electrical motor 22 having a motor output shaft (not shown). Motor 22 is coupled to a source of electrical power through connector 20. Motor 22 will be periodically connected to such electrical power to rotate the motor output shaft first in one direction and then subsequently in a second opposite direction as determined by microprocessor controller 18 on circuit board 19. When the motor output shaft rotates in one direction, parking brakes 2 are engaged. When the motor output shaft rotates in an opposite direction, parking brakes 2 are disengaged.

The output shaft of motor 22 is connected to various stages 24 of a gear reduction assembly 26 that provides a substantial speed reduction between the output shaft of motor 22 and a housing output shaft 30. Three such gear reduction stages 24a, 24b and 24c are shown in FIG. 2 with each stage 24 comprising a small diameter input gear 27 in engagement with a large diameter output gear 28. Input gear 27 in first stage 24a is carried on the motor output shaft. Output gear 28 in the last stage 24c of gear reduction assembly 26 is coupled to the housing output shaft 30 for rotating housing output shaft 30 with output gear 28 of the last stage 24c. Housing output shaft 30 is rotatably journalled in bushings 32 carried in housing 10 and has opposite ends 34 that protrude outside of housing 10.

Two brake actuating rods 36 are provided—one for each parking brake 2. One end 35 of each brake actuating rod 36 is pivotally connected by a pivot pin 38 to one end of a connecting link 40 that is non-rotatably carried on one of the outwardly protruding ends 34 of housing output shaft 30. Each brake actuating rod 36 extends away from housing 10 towards one of the parking brakes 2 on one side of the mower. As shown in FIG. 1, each brake actuating rod 36 has an opposite end 37 that is threaded to carry an abutment in the form of a nut 42. Each brake actuating rod 36 also carries a washer-like, fixed abutment 44 that is spaced away from nut 42 some distance along the length of rod 36.

Referring now to FIGS. 5 and 6, each lever 6 has an enlarged head 7 that includes a bore extending therethrough to allow a connecting portion 39 of one of the brake actuating rods 36 to slidably pass through the bore in head 7. Fixed abutment 44 is located spaced from one side of head 7 while nut 42 will be located spaced from the other side of head 7 when nut 42 is installed on the threaded end 37 of rod 36. Biasing springs 46a and 46b and loose washers 48 are positioned between opposite sides of head 7 and nut 42 and fixed abutment 44, respectively. Loose washers 48 are located substantially proximate to opposite sides of head 7. Springs 46 are thus arranged so that at least one spring 46 is compressed in each of the brake engaged and brake disengaged positions. The arrangement of springs 46 and washers 48 relative to head 7 of lever 6 is duplicated on each actuating rod 36 for each lever 7 with FIGS. 5 and 6 showing this arrangement only on one side of the mower.

Figure 3:
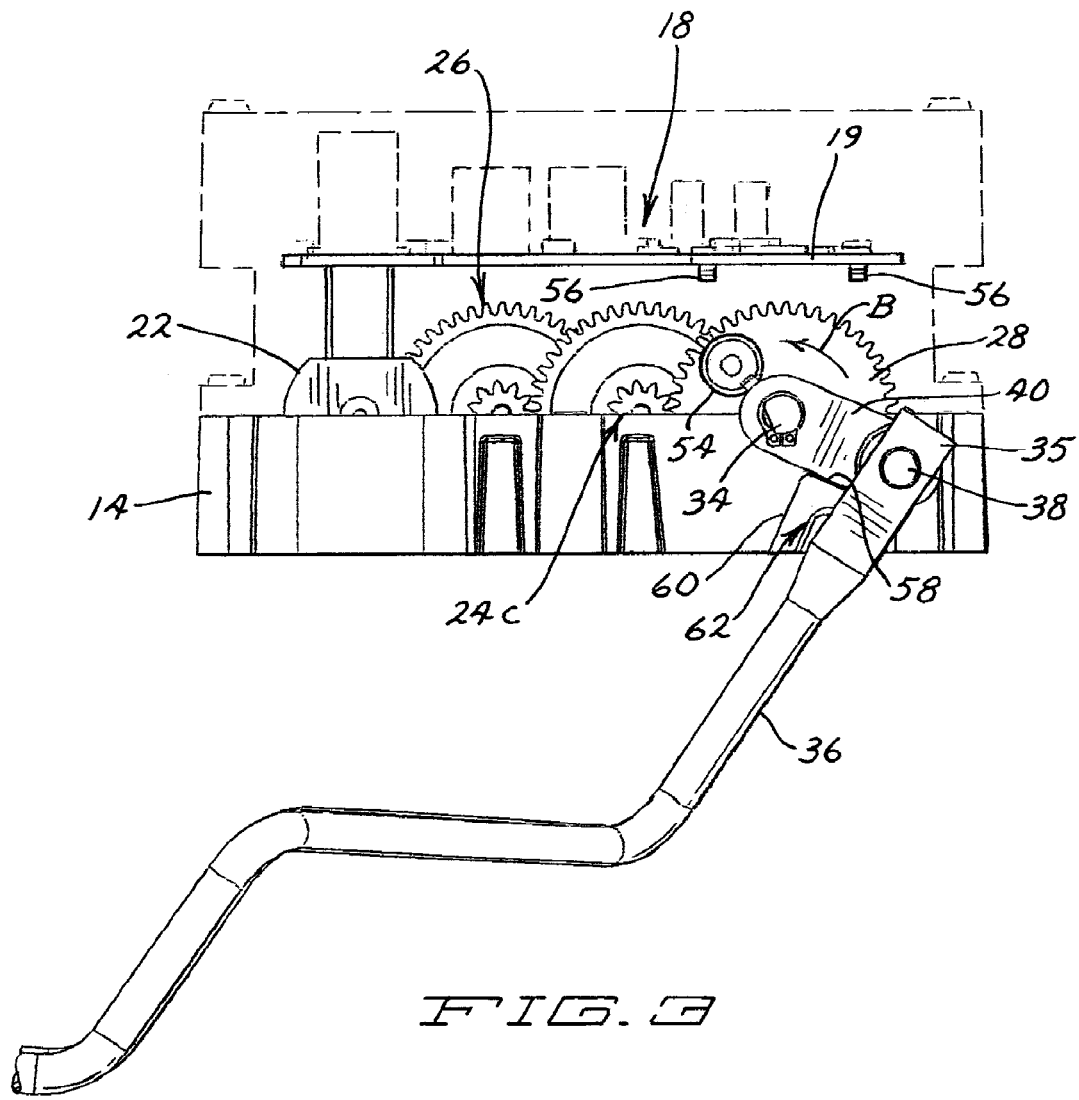
FIG. 3 is a side elevational view of that portion of the parking brake actuator system shown in FIG. 2, particularly illustrating the brake actuating rods in their brake disengaged positions.

Referring now to FIG. 3, system 8 is shown in the brake disengaged position in which the connecting end 35 of each actuating rod 36 is positioned behind housing output shaft 30 in a first overcenter position as shown in FIG. 3. In this brake disengaged position, parking brake 2 has the lever thereof 6 pivoted or swung away from gear 4 until lever 6 and gear 4 are disengaged from one another as shown in FIG. 5. In this brake disengaged position, spring 46 extending between nut 42 and head 7 has been compressed while the opposite spring 46 between fixed abutment 44 and head 7 is uncompressed and is, in fact, loose on rod 36. A small tab or finger 50 carried on lever 6 engages against a stop 52 carried on the transmission or transaxle to define the brake disengaged position of lever 6.

Figure 4:
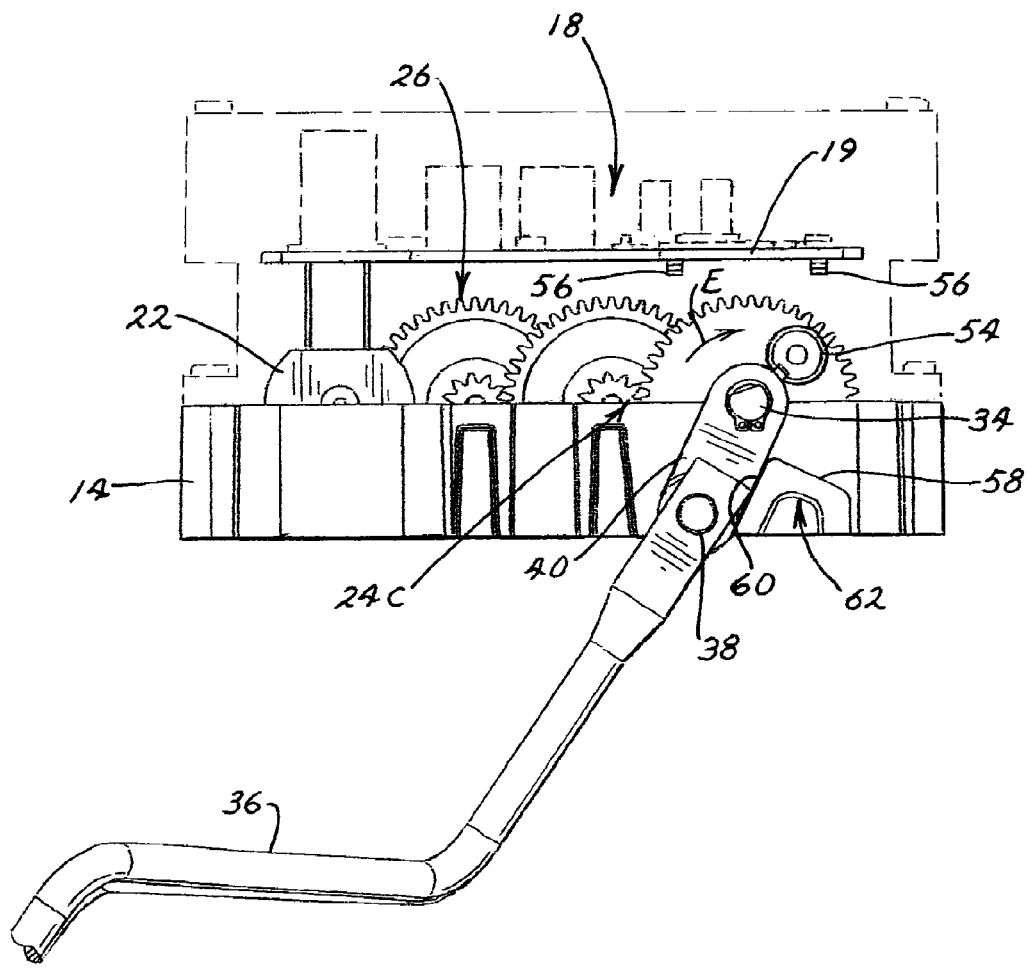
FIG. 4 is a side elevational view similar to FIG. 3, but showing the brake actuating rods in their brake engaged positions.

As also shown in the brake disengaged position of FIG. 3, a magnet 54 located on output gear 28 of the last gear stage 24c is aligned beneath one of a pair of front and rear reed switches 56 carried on the bottom of printed circuit board 19. The alignment of magnet 54 beneath front reed switch 56 is used to signal to microprocessor controller 18 that the brake disengaged position has been reached. Similarly, when magnet 54 becomes aligned with the other reed switch 56 as shown in FIG. 4, this signals to microprocessor controller 18 that the brake engaged position has been reached. The signals from reed switches 56 when such are tripped or activated by magnet 54 are used to end the rotation of the motor output shaft to conclude a brake engaging or disengaging actuation of rods 36.

The control sticks used by the operator to control the operation of the dual independent drives of the mower may be placed in one of two laterally spaced positions—a first inboard position in front of the operator and a second outboard position in which the sticks have been laterally swung or pivoted to the side of the operator to allow the operator to mount and dismount from the operator seat on the mower, as shown and described in the 116 patent incorporated herein by reference. Each stick has an electrical switch associated therewith to detect whether the control stick corresponding thereto is in the inboard or outboard position thereof. In addition, the mower traditionally has a key switch by which the electrical system of the mower is powered or unpowered, determined by whether the key switch is on or off, respectively. Microprocessor controller 18 on circuit board 19 remains powered through a battery even when the key switch is turned off.

Assume now that the key switch is on and the control sticks are in their operating position in front of the operator. In this situation, the parking brakes 2 will be in their brake disengaged positions, as shown in FIGS. 3 and 5, respectively. The compressed spring 46a between nut 42 and head 7 of lever 6 will bias rod 36 in a direction as indicated by the arrow A in FIG. 5. The biasing force on rod 36 acting in direction A in FIG. 5 keeps rod 36 in its first overcenter position relative to housing output shaft 30 with connecting link 40 being abutted against a first stop 58 located on the adjacent side wall of bottom 14 of housing 10 as shown in FIG. 3. Thus, the compressed spring 46a acting in the direction A shown in FIG. 5 pulls connecting link 40 downwardly until connecting link 40 tightly abuts against first stop 58 as shown in FIG. 3 to retain actuating rod 36 and the lever 6 associated therewith in their brake disengaged positions shown in FIG. 5.

If the operator subsequently moves both of the control sticks laterally outwardly to their outboard positions to permit the operator to dismount the mower, the action of moving the control sticks to their outboard positions will be detected by the switches associated with those control sticks. When both switches detect that both control sticks have been placed in their outboard positions, a data signal will be sent to microprocessor controller 18 to indicate this fact. Microprocessor controller 18 will then start rotation of the output shaft of electrical motor 22.

Motor 22 will be actuated by microprocessor controller 18 to rotate housing output shaft 30 in a counter-clockwise direction B in FIG. 3 causing the pivot pin 38 attaching actuating rod 36 to connecting link 40 to move up and over the center of housing output shaft 30. This rotation of housing output shaft 30 causes actuating rods 36 carried on the ends 34 of housing output shaft 30 to move from their brake disengaged positions shown in FIGS. 3 and 5 to their brake engaged positions shown in FIGS. 4 and 6. Connecting portions 39 of rods 36 will move substantially along the axes of elongation of connecting portions 39 in the direction of arrow C in FIG. 6 to accomplish this action. The counter-clockwise rotation B of housing output shaft 30 will continue for more than 180°, i.e. for approximately 270°, to allow movement between the first and a second overcenter position. When magnet 54 becomes aligned with the rear reed switch 56, this is signaled to microprocessor controller 18 which signal is used to turn off electrical motor 22. This ends the operation of motor 22 with actuating rods 36 and parking brakes 2 now being disposed in their brake engaged positions in which the teeth on levers 6 have been brought into engagement with gears 4 to prevent any rotation of the transmissions or transaxles to which gears 4 are coupled.

In the brake engaged position, the connecting end 35 of actuating rod 36 has moved in front of motor output shaft 30 into the second overcenter position. In the brake engaged position, the other spring 46b between fixed abutment 44 and the other side of head 7 has now been compressed such that a bias is applied to actuating rod 36 in the direction of arrow D in FIG. 6. The biasing force acting in the direction of arrow D in FIG. 6 *retains* rod 36 in its second overcenter position with connecting link 40 now being abutted against a second stop 60 located on the adjacent side wall of bottom 14 of housing 10 as shown in FIG. 4. Thus, the compressed spring 46b acting in the direction D shown in FIG. 6 pushes connecting link 40 rearwardly until connecting link 40 tightly abuts against second stop 60 as shown in FIG. 4 to retain actuating rod 36 and the lever 6 associated therewith in their brake engaged positions as shown in FIG. 6. First and second stops 58 and 60 are duplicated on opposite side walls of housing bottom 14. No stop 52 is required in the brake engaged position since engagement of parking brake 2 against gear 4 acts as its own stop. Accordingly, there is a positive spring force provided by one of the springs 46 tending to retain parking brakes 2 in each of the brake engaged and disengaged positions thereof.

In some cases, an operator might switch off the key switch and attempt to laterally pivot the control sticks into their outboard positions while the mower coasts to a stop but before it has completely stopped. In this situation, moving the parking brakes 2 immediately to their brake engaged positions might damage them or damage some portion of the parking brake actuator system 8. Accordingly, if microprocessor controller 18 detects the key switch being placed in the off position before it detects that both control sticks have been placed into their outboard positions, it will delay the operation of motor 22 by a time delay sufficient to allow the inherent braking action of the hydrostatic transmissions or transaxles to take effect and to bring the mower to a complete stop before the parking brakes 2 are applied. A time delay of five seconds has been found to be sufficient.

Going back to the brake disengaged position from the brake engaged position is the reverse of what is described above. When the key switch is on and when either of the control sticks is moved back into their inboard position in front of the operator, the motion of the control sticks into that position is detected. The motion of any one control stick into its inboard position will be sufficient to initiate operation of motor 22. Motor 22 is now operated by microprocessor controller 18 reversely to its direction of rotation when the parking brakes 2 were being applied, namely in a clockwise direction E as shown in FIG. 4, to move parking brakes 2 and actuating rods 36 back to their brake disengaged positions.

Connecting portions 39 of rods 36 will move substantially along the axes of elongation of connecting portions 39 in the direction of arrow F in FIG. 5 to accomplish this action. This rotation of motor 22 in the clockwise direction E continues through approximately 270° until magnet 54 is aligned with front reed switch 56, which then is used as a signal by microprocessor controller 18 to end the operation of motor 22.

Parking brake actuator system 8 of this invention is inexpensive and reliable in operation. Electrical motor 22 and reed switches 56 are inexpensive compared to the use of an electrical solenoid. In addition, motor 22 applies a substantially constant force on actuating rods 36 in moving them from one position to another. In contrast, the force applied by a solenoid tends to decrease or tail off at one end of its stroke in one direction which in some circumstances might result in the parking brakes not fully engaging or disengaging.

Various modifications of this invention will be apparent to those skilled in the art. For example, while first and second stops 58 and 60 have been shown as various surfaces on a generally U-shaped, downwardly facing boss 62 molded to the side wall of housing bottom 14, stops 58 and 60 could be separate flanges or tabs molded to the side wall of housing bottom 14. Moreover, while parking brakes 2 have been shown as pivotal, toothed levers 6, other types of parking brakes could be used. Finally, parking brake system 8 of this invention is not limited for use with a mower. System 8 could be used on other types of outdoor power equipment units have some type of implement for performing a turf or ground grooming or working operation. Thus, the scope of this invention will be limited only by the appended claims.

The invention claimed is:

1. A parking brake actuator system for an outdoor power equipment unit having an implement for performing a turf or ground grooming or working operation, the outdoor power equipment unit having at least one parking brake which prevents motion of the outdoor power equipment unit when the parking brake is in a brake engaged position and which permits motion of the outdoor power equipment unit when the parking brake is in a brake disengaged position, which comprises:
   (a) a reversible electric motor having a rotatable output shaft;
   (b) a second rotatable output shaft that is separate from the motor output shaft and is driven from the motor output shaft through a speed reduction assembly such that the second output shaft rotates more slowly than the motor output shaft;
   (c) a connecting link operatively connected to the second output shaft for rotation therewith;
   (d) a brake actuating rod that has a pivot connection to the connecting link with the pivot connection being off-center relative to the rotational axis of the second output shaft;
   (e) the brake actuating rod also having a connecting portion that is operatively coupled to the parking brake, wherein the connecting portion of the brake actuating rod is elongated along an axis of elongation and moves in opposite substantially straight line directions along the axis of elongation when the second output shaft is rotated in opposite rotary directions to thereby allow the connecting portion of the brake actuating rod to place the parking brake in the brake engaged and disengaged positions; and
   (f) wherein the parking brake comprises a pivotal brake lever that pivots at one end and has a free end, wherein the free end has a bore which slidably receives the connecting portion of the brake actuating rod with the free end of the lever being located between first and second springs that are concentrically located around the connecting portion of the brake actuating rod, wherein the first spring bears against a first abutment carried on the connecting portion of the brake actuating rod spaced from a first side of the free end of the lever and against the first side of the free end of the lever, and wherein the second spring bears against a second abutment carried on the connecting portion of the brake actuating rod spaced from a second opposite side of the free end of the lever and against the second side of the free end of the lever.

2. The system of claim 1, wherein the pivot connection of the brake actuating rod has a first overcenter position relative to the second output shaft when the parking brake is in the brake disengaged position and a second overcenter position relative to the second output shaft when the parking brake is in the brake engaged position.

3. The system of claim 2, wherein the first spring is compressed in the brake disengaged position to develop a biasing force urging the brake actuating rod into the first overcenter position, and wherein the second spring is compressed in the brake engaged position to develop a biasing force urging the braking actuating rod into the second overcenter position.

4. The system of claim 3, further including a first stop that prevents the brake actuating rod from moving out of the first overcenter position under the biasing force of the first spring, and further including a second stop that limits the brake actuating rod from moving out of the second overcenter position under the biasing force of the second spring.

* * * * *